United States Patent [19]

Bray

[11] 4,219,991

[45] Sep. 2, 1980

[54] TASSEL PULLER

[76] Inventor: Thomas B. Bray, Rte. 1, Wapella, Ill. 61777

[21] Appl. No.: 891,447

[22] Filed: Mar. 29, 1978

[51] Int. Cl.² ........................................... A01D 45/02
[52] U.S. Cl. ............................................ 56/63; 171/58
[58] Field of Search ..................... 56/51, DIG. 1, 104, 56/14.1, 63; 171/58

[56] References Cited

U.S. PATENT DOCUMENTS

| | | | |
|---|---|---|---|
| 3,182,378 | 5/1965 | Shorner | 56/DIG. 1 |
| 3,511,038 | 5/1970 | Gates et al. | 56/DIG. 1 |
| 3,769,782 | 11/1973 | Cler | 56/51 |
| 3,855,761 | 12/1974 | Louks | 56/51 |
| 4,027,733 | 6/1977 | Eisenhardt | 56/51 |
| 4,120,363 | 10/1978 | Ernst | 171/58 |

Primary Examiner—Jay N. Eskovitz
Attorney, Agent, or Firm—Fishburn, Gold and Litman

[57] ABSTRACT

Corn detasseling apparatus is disclosed that comprises first and second sets of cylindrical segments aligned end-to-end to form first and second rollers, respectively, that are mounted on a frame in parallel contacting relationship. The circumferential surfaces of the cylindrical segments of the first roller are in contact with those of the second roller to define a detasseling nip. Since it is preferred that the circumferential surfaces of the cylindrical segments be made of a resilient material, the segments can be inflatable tires that are abutted end-to-end to form a roller, and in which case the circumferential surfaces are on the treads of the tires. In accordance with the present invention, the number of cylindrical segments in a set can be varied to adjust the length of the roller, the location of the segments on the roller can be changed to minimize wear, and damaged or worn segments can be replaced without having to replace an entire roller. The use of cylindrical segments having a relatively large diameter provides satisfactory operation at lower roller speed, better visibility for the operator, greater surface contact for the gripping of tassels, and a wider channel that leads to the detasseling nip.

25 Claims, 7 Drawing Figures

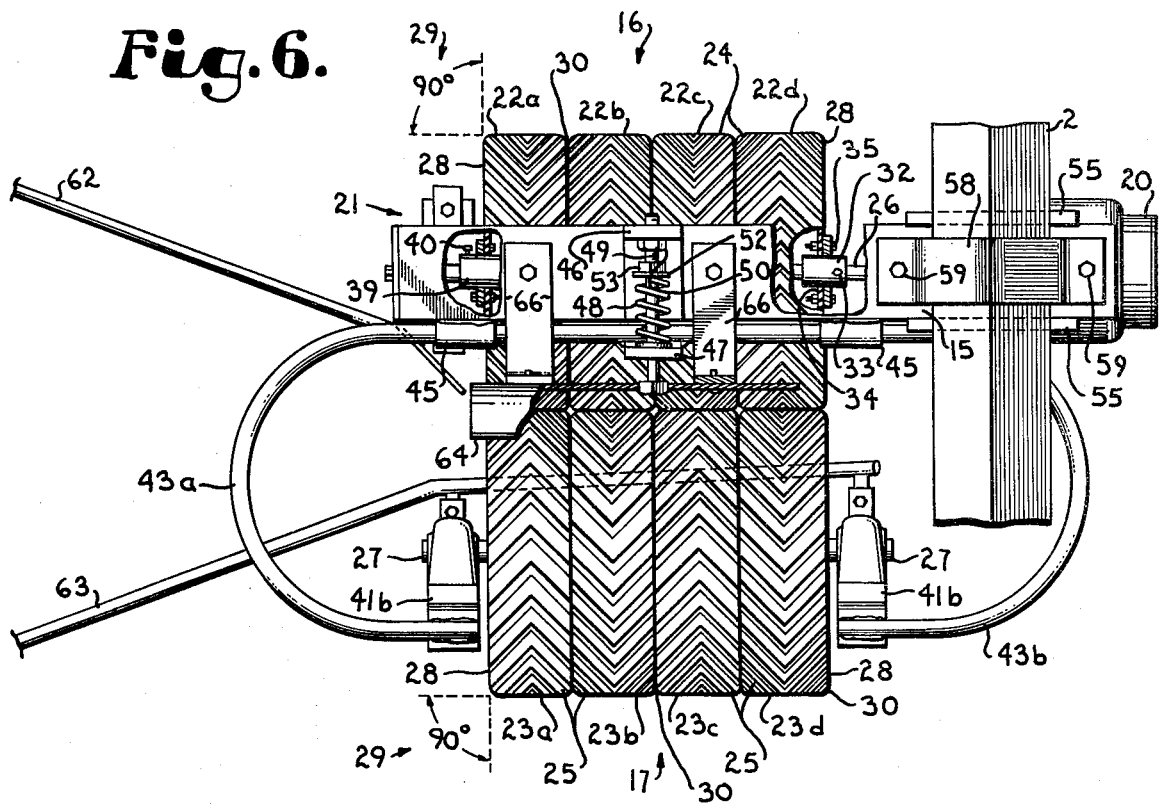
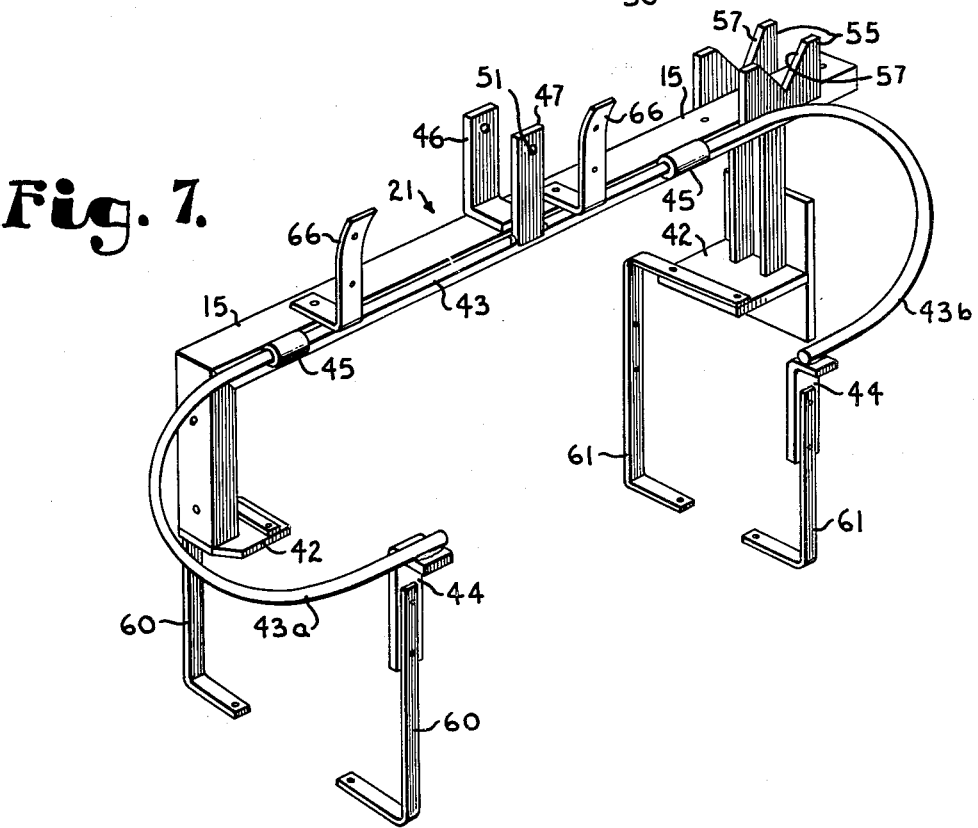

TASSEL PULLER

BACKGROUND OF THE INVENTION

This invention pertains to apparatus for removing tassels from plants, and more particularly pertains to an improved detasseling head with parallel contacting rollers that grasp corn tassels in a nip and pull them off of the stalks.

Production of hybridized seed corn requires removal of the tassel from parent plants to prevent self-fertilization of the ear buds thereon. Fertilization must be accomplished instead by growing pollen-producing plants of another variety of corn in alternate rows with parent plants, or else a suitable pollen can be deposited onto the parent plants by use of a suitable vehicle such as a dusting aircraft.

Tassels can be removed from corn plants by hand, and although it is a very thorough means of detasseling that inflicts minimum damage to the stalks and leaves of the plants, it is nonetheless quite time consuming and expensive. As a consequence, various mechanical devices have been developed for detasseling corn, most of which can be mounted on a suitable tractor and operated with a power take-off or hydraulically. Such detasseling apparatus can be generally classified as either cutter or puller types, depending on whether they cut the tassels by means of blades that move in a horizontal plane, or pull them off the stalks by grasping them in the nip of contacting rollers. Cutter type devices effect detasseling in a relatively quick and thorough fashion, but are more inclined than pullers to damage the leaves and stalks of the plants. Such damage reduces the yield of corn, and is thus an objectionable feature of cutter type detasselers. Puller-types are less damaging since they have the ability to grasp the tassel at its top and detach it by pulling upward until it snaps off. The leaves of the plant are not usually drawn into the nip of the roller and are thus left relatively unharmed. In addition, greater stalk damage results from cutting the tassels than from pulling them off.

Although mechanical tassel pullers have become popular, they have not always proven altogether satisfactory for a number of reasons. If the rollers that define a detasseling nip are mounted at an angle with respect to one another, the length of the nip is inclined to be too short, with the result that some tassels may not be grasped or fully pulled off by the nip as the rollers are conveyed over a row of stalks. The same undesirable result can occur if short rollers are mounted in parallel contacting relationship. If the rollers are relatively long, small in diameter, and are turned at a high rate of speed, there are problems with wear of the rollers, directing the tassels into the nip, and visibility of the operator as he attempts to guide the rollers over the tassels while looking beyond the end of the frame on which the rollers are mounted.

SUMMARY OF THE INVENTION

It is therefore an object of the present invention to provide an improved tassel puller which overcomes the previously described problems and disadvantages associated with prior detasseling apparatus.

One specific object of the present invention is to provide a tassel puller having longitudinally segmented detasseling rollers whereby the length thereof can be changed by adding or subtracting segments, and whereby the location of the segments on the rollers can be altered from time to time in order to equalize wear.

Another object is to provide a tassel puller having longitudinally segmented detasseling rollers whereby a worn or damaged segment can be replaced without having to replace an entire roller.

Still another object is to provide a tassel puller having detasseling rollers in parallel contacting relationship and wherein the diameter of the rollers is relatively large so as to provide a larger contact area for gripping tassels, a wider channel leading into the detasseling nip, and lower rotational speed requirements.

Even another object is to provide a tassel puller having longitudinally segmented detasseling rollers wherein the roller segments are inflatable tires of a conventional and readily available variety.

Yet another object is to provide an improved detasseling apparatus that includes a vehicle having a plurality of detasseling heads thereon with longitudinally segmented detasseling rollers, and wherein each detasseling head includes its own individual motor for driving the rollers.

Other objects and advantages of the invention will become apparent from the following description, the drawings, and the appended claims.

The present invention is a detasseling head that comprises a roller frame, first and second sets of cylindrical segments aligned end-to-end to form first and second axially rotatable rollers, respectively, that are mounted on the roller frame so that the circumferential surfaces of the cylindrical segments of the first set are in contact with those of the second set to define a detasseling nip, and means for simultaneously rotating the cylindrical segments of both rollers.

Since it is preferred that the circumferential surfaces of the cylindrical segments be resilient, inflatable tires can be used as the segments, and in which case the treads of the tires provide circumferential surfaces having the desired resiliency. Accordingly, the tires can be left uninflated, or can be inflated to a low pressure, to avoid bulging as would prevent flush contact between the treads of opposing tires on the first and second rollers.

BRIEF DESCRIPTION OF THE DRAWINGS

FIG. 6 is a top view of the detasseling head shown in FIG. 3.

FIG. 7 is a perspective view of the roller frame used with the detasseling head shown in FIG. 3.

DESCRIPTION OF PREFERRED AND ALTERNATIVE EMBODIMENTS

Figure 1:
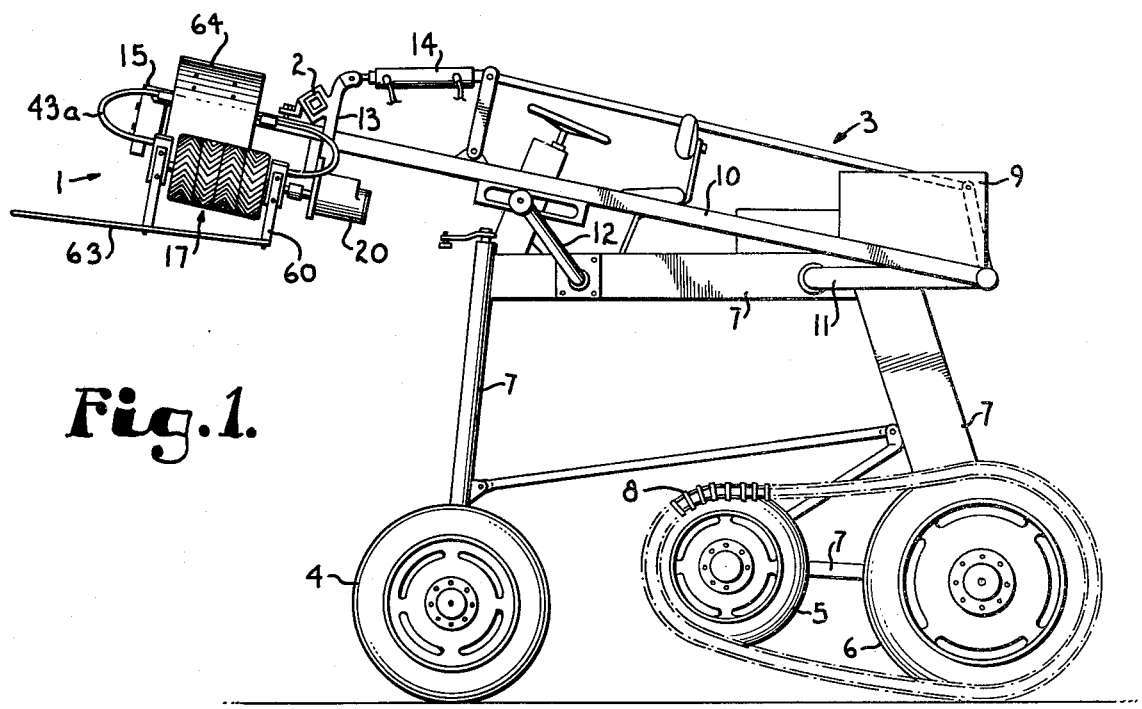
FIG. 1 is a side view of a wheeled, power driven vehicle which has detasseling heads thereon that are constructed in accordance with the present invention.
Figure 2:
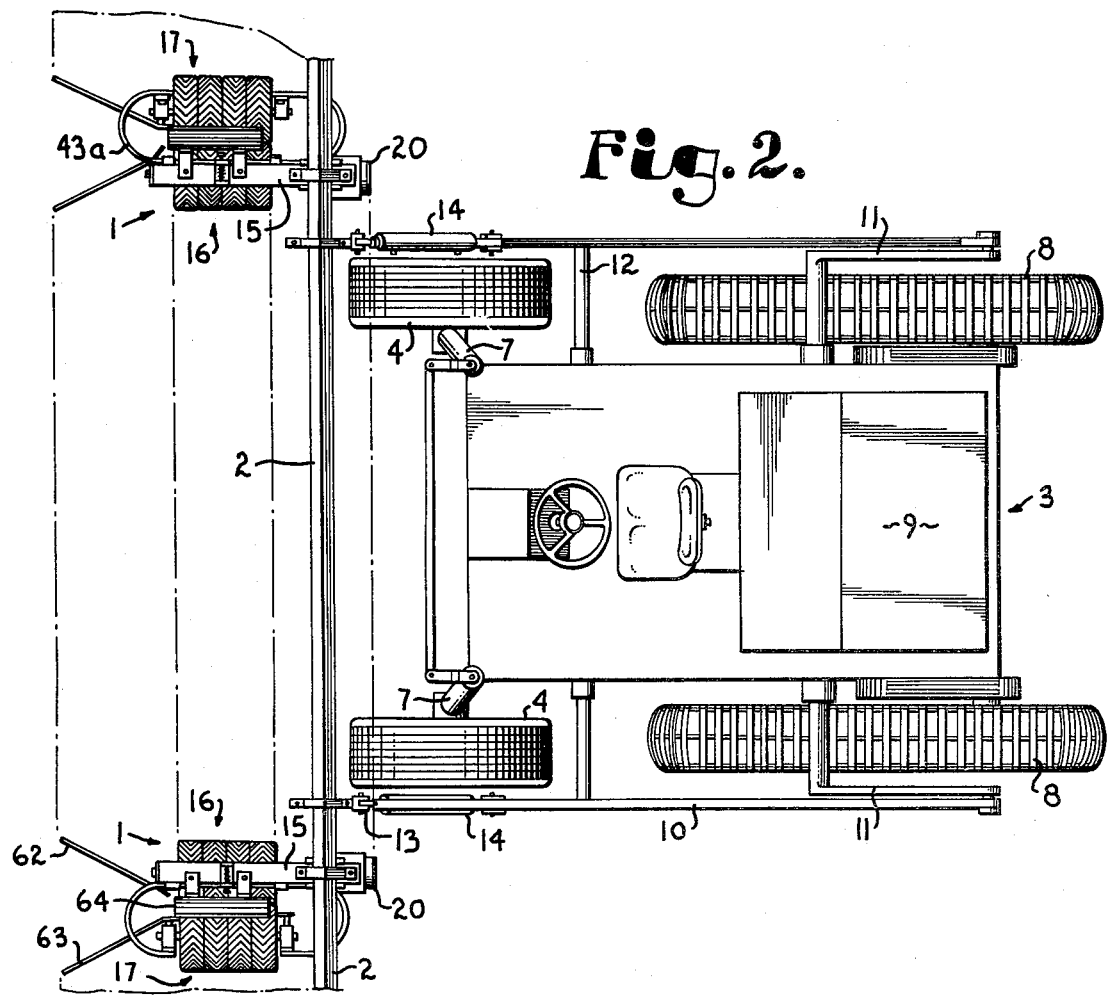
FIG. 2 is a top view of the vehicle shown in FIG. 1.

In FIGS. 1 and 2, detasseling heads 1 constructed in accordance with the present invention are attached to a front-mounted tool bar 2 on a vehicle 3 having ground engaging wheels 4, 5, 6 mounted on main frame members 7 of the vehicle. Cleated tracks 8 extend around wheels 5 and 6 to improve traction. Wheels 4 are steerable by an operator to control the direction of travel of the vehicle, and an engine for driving wheels 5 and 6 is located in compartment 9.

Tool bar 3 having the detasseling heads 1 thereon is mounted on a boom 10. The rear end of the boom can be raised and lowered by means of rear pivot arms 11. The front end of the boom can be raised and lowered by means of front pivot arms 12. It will be apparent that the entire boom can be raised and lowered by respectively raising or lowering the front and rear pivot arms simultaneously, and that the front of the boom can also be raised or lowered by lowering or raising, respectively, the rear pivot arms 11 while the front pivot arms remain fixed in a selected position. Boom 10 and pivot arms 11 and 12 thus provide means for adjusting and maintaining the height of the detasseling heads 1 above the ground and, more specifically, provide means for placing and holding the heads at an elevation for proper engagement of tassels on corn plants with the nip of the rollers of the heads.

The tool bar 2 is mounted on tool pivoting arms 13 that are pivotally attached to the front end of boom 10. Upon actuation of hydraulic cylinders 14, arms 13 are pivoted forwardly or rearwardly in order to swing the tool bar in the same direction. Since the rigid first member 15 of the roller frame of the detasseling head extends transversally from the tool bar and forwardly thereof, pivoting of the arms 13 rearwardly cause the front end of the detasseling heads to become elevated with respect to the rear thereof, thereby increasing the angle at which rollers 16 and 17 of the detasseling heads are inclined with respect to the horizon. Conversally, pivoting of the arms 13 forwardly decreases the angle at which the rollers are inclined. The ability to adjust the incline of the roller provides means for regulating the degree to which the feed channel 18 between the rollers (FIGS. 4 and 5) is exposed for confrontal approach of the circumferential roller surfaces to tassels aligned in a row, hence facilitating the guidance of tassels into the detasseling nip 19, and also improving control over the detasseling operation as a whole. As can be seen in FIG. 2, each of the detasseling heads is provided with its own hydraulic motor 20 for driving the rollers 16 and 17. Adequate power is thereby supplied to each head while avoiding use of troublesome chain or belt drives.

In FIGS. 3, 4, 6 and 7, the first roller 16 and the second roller 17 of the present detasseling head are mounted on the roller frame 21 and are made up from first and second sets of cylindrical segments 22, a, b, c, d and 23 a, b, c, d, respectively, that are aligned in end-to-end relationship. Rollers 16 and 17 are thus longitudinally segmented and are aligned side-by-side in parallel contacting relationship so that circumferential surfaces 24 of the cylindrical segments 22 of the first set are in contact with the circumferential surfaces 25 of the second set 23 to define the detasseling nip 19. As was previously indicated, a drive means such as hydraulic motor 20 is used for rotating the cylindrical segments of both rollers.

Each of the cylindrical segments 22 and 23 shown in the drawings has the same length and diameter, but segments having different lengths and diameters can be used when such is preferred. In addition, the first set of segments 22 of the first roller 16 are rotated by turning a first shaft 26 with motor 20, whereas the second set of segments 23 of the second roller 17 are mounted on a second shaft 27 and are rotated by frictional contact of their circumferential surfaces 25 with those of the first set of rollers 22. Consequently, the rollers 16 and 17, and the segments thereof, rotate in opposite directions. Where preferred, each of the shafts 26 and 27 can be driven by a motor.

To advantage, the circumferential surfaces 24 and 25 of the segments 22 and 23 can be resilient surfaces in order to improve the gripping of tassels at the nip 18 of the rollers. Even though the segments can be rigid cylinders except at their circumferential periphery, inflatable tires having resilient rubber side walls and treads are used as cylindrical segments in preferred embodiments of the invention, and in which case a resilient circumferential surface resides on the tread of the tires. The drawings show use of conventional groove treaded tires as segments for the rollers. The tires can be left uninflated or can be only slightly inflated so as to prevent bulging of the sidewalls and the treads thereof. Accordingly, the pressure within the tires can be maintained within the range of about one to about two atmospheres, absolute. Smooth treaded tires can be used if preferred.

Figure 3:
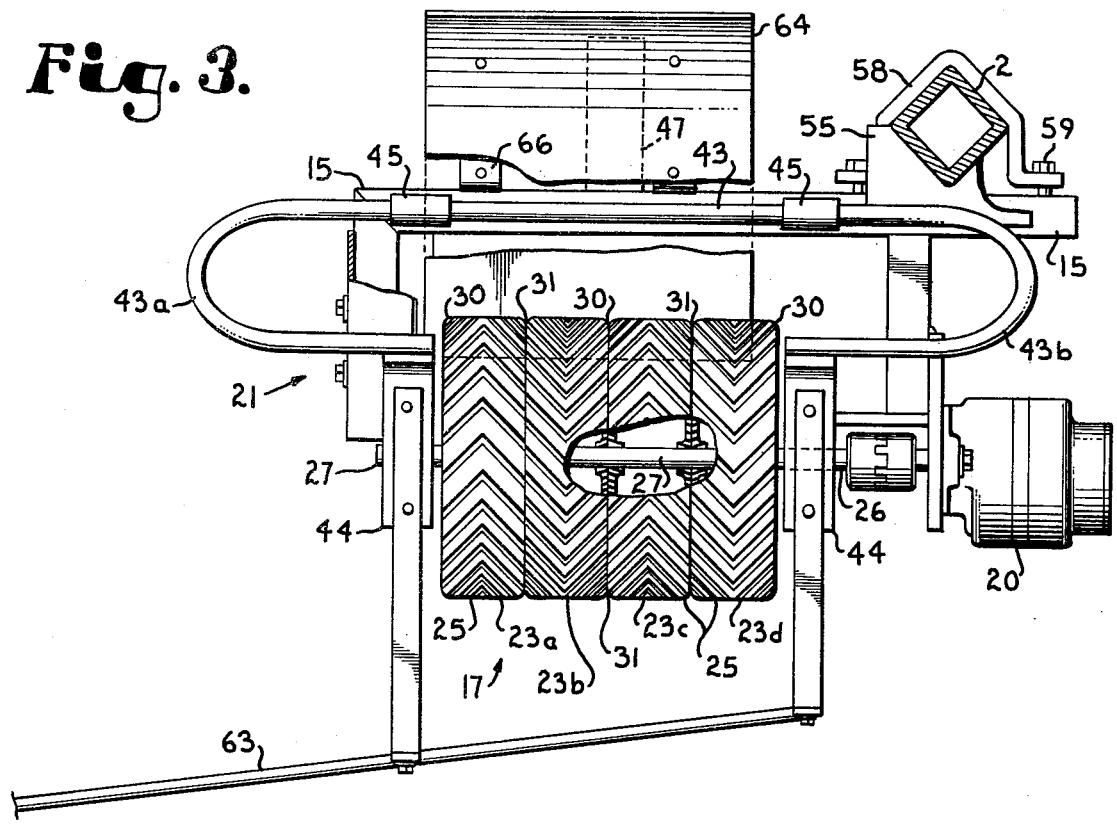
FIG. 3 is a side view, partly in section, of a detasseling head constructed in accordance with the present invention.

Although longitudinal spacing between the cylindrical segments of each set is permissable, it is preferred that the segments be abutted end-to-end as shown in the drawings. It is additionally preferred that the cylindrical segments of each set have substantially the same diameter, substantially parallel ends 28, and also have circumferential surfaces with a substantially straight longitudinal extension in right angle relation to the ends 28. This right angle relationship of the circumferential surfaces 24 and 25 to the ends 28 of the segments is shown at 29 in FIG. 6. Since inflatable tires typically include a beveled corner 30 at the junction of the tread and the sidewalls, it will be understood that when the tires are abutted end-to-end as cylindrical segments of the rollers, that the circumferential surface of one tire will be longitudinally separated from that of an adjacent tire by a circumferential groove 31 (FIG. 3). The presence of these grooves in the rollers is not detrimental to the detasseling operation, and it is possible to compress the tires together in an axial direction so as to minimize the width of the grooves.

Figure 4:
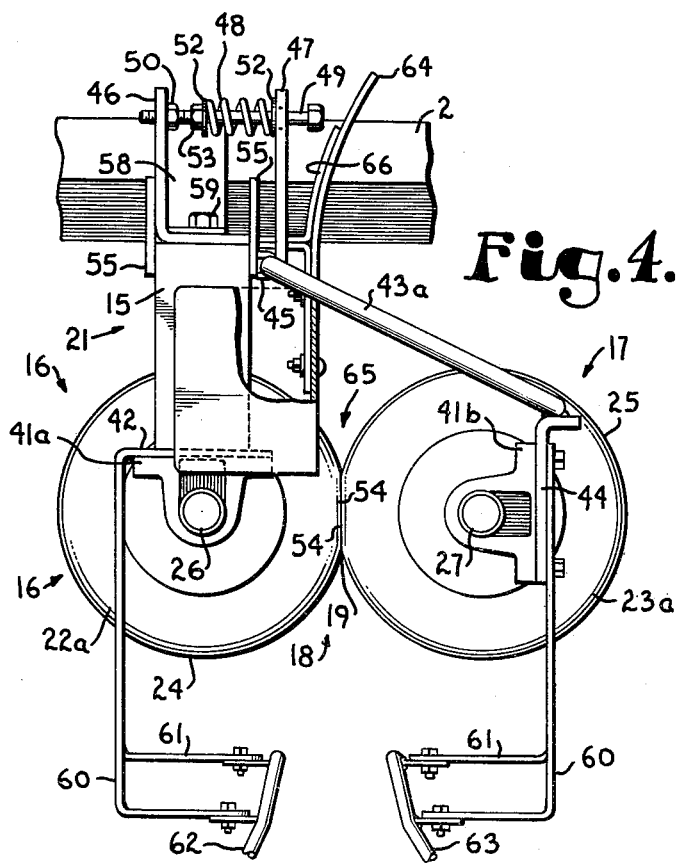
FIG. 4 is a front view of the detasseling head shown in FIG. 3.

In FIGS. 3, 4 and 6, the first set of segments 22 and the second set 23 are spindled on first and second shafts, shown at 26 and 27, respectively, that are mounted on the roller frame 21. It is preferred that at least one of the shafts be rotatable and have at least one of the cylindrical segments thereon attached thereto so that all the cylindrical segments of a set can be rotated by turning the shaft. More specifically, a coupling 32 (FIG. 5) can be spindled on shaft 26 and locked thereon with bolt 33, with the wheel 34 on which tire 22d is mounted being engaged with the coupling by sliding the coupling lugs 35 into lug holes (not shown) in the wall of the wheel. At the outer end of the roller 16, a wheel keeper 39 is spindled onto the shaft 26, is secured thereto with bolt 40, and is used to hold all tires of the set tightly abutted in end-to-end relationship, so that upon turning shaft 26 with motor 20, tire 23d is turned by engagement with the shaft through coupling 22, whereas tires 22c, 22b and 22a are rotated by frictional contact with tires 22d, 22c and 22b respectively. Where preferred, a coupling such as 32 can be substituted for keeper 40, or the wheel of each of the tires can be coupled to shaft 26. Coupling means other than the type shown at 32 can also be used. Alternatively to coupling with the shaft 26, the wheels of the tires 22 can be arranged to rotate freely on the shaft, and can be caused to rotate by contact with a drive wheel that is placed in contact with one or more of the circumferential surfaces 24 of the tires.

Since the tires 23 are rotated by contact with the tires 22, they can free-wheel on shaft 27, or at least one of the tires 22 can be rotatively engaged therewith by means of a coupling such as 32. In either case, the treads of tires 23 can be maintained aligned with those of tires 22 by use of keepers and/or couplings on shaft 27. It will be appreciated that tires 23 are caused to rotate by flush contact of their treads with the treads of tires 22, and it is thus not essential that the tires have protuberances on the treads, such as tread ribs, whereby tires 22 interlock with tires 23 to facilitate rotation of the latter. Use of several tires in a set provides sufficient contact between the first and second rollers to assure continuous rotation of the latter, and the edge-to-edge contact between the tires of the sets further assures continuous rotation of each segment at all times. If, for example, four tires are used to make up each roller, all in each set will continue to rotate if tread contact is substantially broken between two or even three tires of each set by rapid intake of tassels by the detasseling nip.

Roller shafts 26 and 27 are rotatably attached to the roller frame 21 by means of pillow block bearings 41. In FIGS. 4, 6 and 7, the roller frame includes a rigid first member 15 on which the first roller 16 is mounted by securing shaft 26 in pillow block bearings 41a that are attached to brackets 42. The second roller is mounted on a second rigid member 43 of the roller frame in a similar fashion, i.e. the shaft 27 of the second roller is secured in pillow block bearings 41b that bolt onto brackets 44 of the second member. It should be noted that although the second member 43 is rigid, it is mounted on hinges 45 of the first member 15 for pivoting of the second roller 17 laterally of the first roller 16 while both rollers remain in parallel relationship with each other. The rigid first member is longitudinally elongated with respect to the rollers 16 and 17, and the rigid second member includes end portions 43a and 43b which extend to a laterally outward location with respect ot the first member 15. Shaft 27 of the second roller is attached to these end portions by means of pillow block bearings 41b that mount on brackets 44. As shown in the drawings, the rigid second member can be formed by bending a length of bar stock or thick walled pipe to provide large radius curved end portions whereby sharp bends or weld joints in the second member are obviated.

Even though the weight of the second roller 17 will cause it to pivot downward from the first rigid member 15 and rest firmly against the first roller 16, thus assuring rotation of the second roller by contact with the first, there is nonetheless an advantage to inclusion of means for continuously urging the second roller to pivot laterally toward the first roller. Such can provide even firmer contact between the two rollers, and diminishes any tendency of the second roller to intermittently or continuously bounce on the first during detasseling operations that tend to force the rollers apart as the tassels enter the nip 19. One means for continuously urging the second roller toward the first roller is illustrated in FIGS. 4 and 6 of the drawings wherein spring rests 46 and 47 are attached, respectively, to the rigid first and second members 15 and 43 of the roller frame, and a compressed spring 48 resides between the rests and presses against each one.

Spring rest 46 on the rigid first member 15 comprises a means for adjusting the compressive tension in the spring. This adjusting means includes a bolt 49 having a threaded end that screws into bracket 46, is locked in place thereon by means of a first nut 50 and has an elongated body portion which leads from the threaded end thereof and extends freely through a somewhat enlarged hole 51 (FIG. 7) in spring rest 47. The spring 48, and washers 52 at each end thereof, are spindled on the body portion of the bolt, and a second nut 53 on the threaded portion is tightened or loosened to respectively increase or decrease the compressive tension in the spring.

Figure 5:
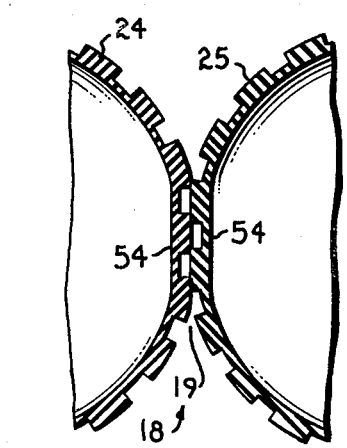
FIG. 5 is a fragmentary, somewhat enlarged, vertical cross-section of two of the cylindrical roller segments of the detasseling head shown in FIG. 3.

The force exerted by spring 48 should be sufficient to assure secure gripping of tassels by the nip 19, and preferably is great enough to effect slight flattening of the treads of opposed tires as shown at 54 in FIGS. 4 and 5. Accordingly, the gripping surface of each roller can be increased, and the degree of flattening is subject to variation depending not only on the amount of compressive tension in spring 48, but also on the stiffness, diameter, and/or inflation pressure (if any) of the tires. The degree to which the tires should be flattened to provide an optimum gripping effect can be determined by a few simple experiments, but it will be apparent that the gripping surfaces which can be provided by flattening the tires can have a much greater area than is practical to obtain by contacting stiffer rollers having a smaller diameter.

Other features that can be included on the present detasseling head include bracketing means for attachment to a conveying vehicle, guide means for guiding tassels into the nip of the rollers, and a deflector means for deflecting discharged tassels over the top of one of the rollers and to one side thereof. As shown in the drawings, the bracketing means includes V-notched brackets 55 attached to each side of the rear end of the rigid first member 15 of the roller frame. The V-shaped notches 57 are carefully aligned at a right angle to frame member 15, so that when brackets 55 are attached to the tool bar 2 on vehicle 3 the rotational axes of the rollers are oriented in vertically parallel alignment with the track of the vehicle as shown in FIG. 2. Clamps 58 and bolts 59 are used for rigidly securing the detasseling head to the tool bar once the notched brackets 55 have been positioned thereon at a selected location.

The tassel guiding means shown in the drawings includes downwardly extending front and rear guide brackets 60 and 61, respectively, that are mounted on brackets 42 and 44 for the pillow block bearings that are attached to the first and second members of the roller frame, respectively. Guide bars 62 and 63 are attached to brackets 60 and 61 and extend longitudinally with respect to the rollers 16 and 17 on each side of the nip and somewhat below the feed channel 18. In addition, the guide bars extend forwardly of the rollers, are inclined upwardly toward feed channel 19, and converge toward each other toward the rear of the roller frame.

The deflector means shown in FIGS. 3, 4 and 6 includes a metal plate 64 that extends above the rollers lengthwise and curves over the discharge channel 65 above the nip 19. Accordingly, pulled tassels that are discharged from the rollers at a relatively high rate of speed strike the plate 64 and follow the curvature therein so that their path of travel is directed sideways with respect to roller 17. This causes the tassels to be thrown to one side of the vehicle 3 so that they fall on the ground rather than onto the vehicle and the operator. Deflector plate 64 is attached to the roller frame by means of plate brackets 66 on the rigid first member 15 thereof. Where preferred, an additional deflector plate 67, which can be a portion of plate 64, can be extended forwardly of the roller 16 and curved outwardly toward the side of the roller.

Although the number and diameter of the cylindrical segments that make up a roller is subject to considerable variation, it is preferred that the diameter of the segments be at least about 10 inches and the length of the roller not exceed about 18 inches so that the length to diameter ratio of the rollers does not exceed about 1.8. On the other hand, it is preferred that the rollers have a length to diameter ratio of at least about 0.6. In an especially preferred embodiment, four tires having a width of 3 inches and a diameter of 10 inches are used to make up 10"D.×12"L. rollers.

Prior tassel pullers have utilized detasseling rollers with a diameter of 4–6 inches, but use of larger rollers with the present puller provides several advantages. Fewer mechanical problems are encountered because the rollers can be rotated substantially slower to effect an equivalent speed at which the circumferential surfaces of the segments are conveyed. Larger diameter rollers also provide a larger feed channel 18 that leads to the nip 19, hence making it easier to capture tassels and lead them to the nip 19. In addition, the circumferential surfaces of large diameter rollers can be confrontingly abutted over a greater area, with minimal deformity of their circular configuration to provide greater tassel gripping capability. As a consequence, the rollers need not be as long in order to perform the detasseling operation in a suitably efficient manner, and the visibility of the operator is improved as he looks out over the detasseling heads while steering them along the rows of corn stalks.

It should be pointed out that in prior tassel pullers having elongated detasseling rollers that are integral lengthwise, the rollers are inclined to wear unevenly along their length and must be entirely removed for expensive repair or total replacement. With the present tassel puller, only those segments which have become damaged or excessively worn need be removed for repair or replacement, and when inflatable tires are used for the segments they are relatively inexpensive to replace. In addition, the location of the segments on the rollers can be changed from time to time in order to evenly distribute the wear and maintain the cylindrical shape of the rollers along their length.

A detasseling head that fulfills the previously stated objects has now been described in detail, and even though the description thereof has been with reference to specific embodiments, it will nonetheless be understood that even other embodiments will become apparent which are within the spirit and scope of the invention defined in the following claim.

I claim:

1. A corn detasseling head comprising:
   (a) a roller frame;
   (b) first and second sets of cylindrical segments aligned end-to-end to form first and second axially rotatable rollers, respectively, that are mounted on said frame in parallel contacting relationship, said cylindrical segments being inflatable rubber tires having resilient circumferential tread surfaces, the tread surfaces of the rubber tires of one of said sets being abutted and biased against those of the other set whereby the tires of both sets are compressed to effect flattening of their treads and formation of a detasseling nip that leads to tassel gripping surfaces of increased area as a result of flattening the tires, and
   (c) means for simultaneously rotating the rubber tires of both of said rollers.

2. A detasseling head as in claim 1 wherein the pressure within said tires is maintained within the range of about one atmosphere (absolute) to about two atmospheres (absolute).

3. A detasseling head as in claim 1 wherein said first and second sets of cylindrical segments are spindled on first and second shafts, respectively, that are mounted on said roller frame.

4. A detasseling head as in claim 3 wherein said cylindrical segments on each shaft are abutted end-to-end, and at least one of said segments is rotatable by frictional engagement with the end of an adjacent segment.

5. A detasseling head as in claim 3 wherein at least one of said shafts is rotatable, and at least one of the cylindrical segments thereon is attached thereto for rotation of said segments by rotation of the shaft.

6. A detasseling head as in claim 3 wherein both of said shafts are secured against longitudinal movement with respect to said frame, said first shaft is secured against lateral movement with respect to an assigned axis of rotation therefor, and said second shaft is hingedly mounted on said frame for pivotal movement thereof in parallel relation to said first shaft.

7. A detasseling head as in claim 6 and further comprising means for continuously urging said second shaft pivotally toward said first shaft.

8. A detasseling head as in claim 3 wherein said first shaft is a driven shaft, at least one of said cylindrical segments thereon is attached thereto for rotation by turning the shaft, and wherein the cylindrical segments on said second shaft are adapted for rotation by frictional contact with at least one of the cylindrical elements on said first shaft.

9. A detasseling head as in claim 1 wherein said frame includes a rigid first member having said first roller mounted thereon, a rigid second member having said second roller mounted thereon, and hinging means for said second member whereby the second roller is urged to pivot laterally by its own weight for contact of said segments of the second roller with said segments of the first roller.

10. A detasseling head as in claim 9 and further comprising means for continuously urging said second roller to pivot laterally toward said first roller.

11. A detasseling head as in claim 9 and further including bracketing means on said first member of the frame, said bracketing means being adapted for attaching said frame to a vehicle for orientation of the rotational axes of said rollers in vertically parallel alignment with the line of draft of said vehicle.

12. A detasseling head as in claim 9 and further including guide means for guiding tassels into said nip of the rollers.

13. A detasseling head as in claim 9 and further comprising deflector means located above said rollers for deflecting discharged tassels over the top of one of the rollers and to one side thereof.

14. A detasseling head as in claim 1 wherein the diameter of said cylindrical segments is at least about ten inches.

15. A detasseling head as in claim 1 wherein the length of said rollers does not exceed about eighteen inches.

16. A detasseling head as in claim 1 wherein the length to diameter ratio of said rollers does not exceed about 1.8.

17. A machine for removing tassels from corn comprising:
(a) a main frame having ground engaging wheels thereon;
(b) a detasseling head support member mounted on said frame;
(c) at least one detasseling head mounted on said support member, said head including a roller frame, first and second sets of cylindrical segments aligned end-to-end to form first and second axially rotatable rollers, respectively, that are mounted on said frame in parallel contacting relationship, said cylindrical segments being inflatable rubber tires having resilient circumferential tread surfaces the tread surfaces of the rubber tires of one of said sets being abutted and biased against those of the other set whereby the tires of both sets are compressed to effect flattening of the treads and formation of a detasseling nip that leads to tassel gripping surfaces of increased area as a result of flattening the tires, and
(d) means for simultaneously rotating the rubber tires of both of said rollers.

18. A machine as in claim 17 wherein a plurality of said detasseling heads is mounted on said support member and further comprising an individual motor for each of said heads for rotating said segments of the rollers.

19. A machine as in claim 17 and further comprising height adjusting means for regulating the height of said head above the surface of the ground.

20. A corn detasseling head comprising:
a. a roller frame,
b. first and second sets of inflatable tires aligned end-to-end to form first and second axially rotatable rollers, respectively, that are mounted on said frame in parallel contacting relationship, the circumferential tread surfaces of the tires of said first set being in contact with those of of said second set to define a detasseling nip, the length to diameter ratio of said rollers not exceeding about 1.8, and
c. means for effecting simultaneous rotation of the tires in each of said sets.

21. A detasseling head as in claim 20 wherein the length to diameter ratio of said rollers is within the range of about 0.6 to about 1.8.

22. A detasseling head as in claim 9 wherein said second member comprises end portions which extend laterally and pivot laterally with respect to said first roller, and said second roller is attached to said ends of the second member.

23. A detasseling head as in claim 22 wherein said first member is longitudinally elongated with respect to said rollers, and said second member is hingedly attached to said first member for pivoting of the second roller laterally.

24. A machine as in claim 19 and further comprising means for adjusting, during operation of said machine, the angle at which said rollers are inclined with respect to the horizon.

25. A machine as in claim 24 wherein said detasseling head is pivotally mounted on said frame, and further comprising hydraulic means for pivoting the detasseling head vertically to adjust the angle thereof with respect to the horizon.

* * * * *